United States Patent
Alberty et al.

(10) Patent No.: US 6,178,330 B1
(45) Date of Patent: Jan. 23, 2001

(54) POINT-MULTIPOINT RADIO TRANSMISSION SYSTEM

(75) Inventors: Thomas Alberty, Backnang; Erich Auer, Besigheim, both of (DE)

(73) Assignee: Robert Bosch GmbH, Stuttgart (DE)

(*) Notice: Under 35 U.S.C. 154(b), the term of this patent shall be extended for 0 days.

(21) Appl. No.: 09/155,222

(22) PCT Filed: Nov. 7, 1996

(86) PCT No.: PCT/DE96/02119

§ 371 Date: Sep. 24, 1998

§ 102(e) Date: Sep. 24, 1998

(87) PCT Pub. No.: WO97/36384

PCT Pub. Date: Oct. 2, 1997

(30) Foreign Application Priority Data

Mar. 27, 1996 (DE) .............................. 196 12 107
Sep. 2, 1996 (DE) .............................. 196 35 533

(51) Int. Cl.$^7$ .............................. H04Q 7/20; H04B 1/38; H04J 3/18

(52) U.S. Cl. .............................. 455/452; 455/554; 455/464; 455/450; 370/477

(58) Field of Search .............................. 455/500, 450, 455/451, 452, 454, 455, 463, 464, 62, 63, 67.3, 507, 509, 524, 517, 501, 296, 520, 554, 555, 560; 375/222; 370/477, 468

(56) References Cited

U.S. PATENT DOCUMENTS

| | | |
|---|---|---|
| 5,208,804 | 5/1993 | Wilson et al. ............... 370/343 |
| 5,475,711 * | 12/1995 | Betts et al. ............... 375/240 |
| 5,479,477 | 12/1995 | Chow et al. ............... 455/508 |
| 5,592,470 * | 1/1997 | Rudrapatna et al. ........ 370/320 |
| 5,625,877 * | 4/1997 | Dunn et al. ............... 455/454 |

FOREIGN PATENT DOCUMENTS 36 21 737 1/1988 (DE).
44 26 183 10/1995 (DE).

(List continued on next page.)

OTHER PUBLICATIONS

"Mikrowellenmagazin", vol. 10, No. 6, 1984, pp. 629–630.
E. Auer et al., "Advanced Modem Equipment for Intelsat IDR/IBS Services", Proceedings of Second European Conference on Satellite Communications, Liège, Belgium, Oct. 1991, ESA SP–332, pp. 457–464.

*Primary Examiner*—Dwayne D. Bost
*Assistant Examiner*—Erika A. Gary
(74) *Attorney, Agent, or Firm*—Kenyon & Kenyon

(57) ABSTRACT

In order to permit flexible allocation of transmission capacities in such a radio transmission system, without interrupting or disturbing existing radio links, provision is made for a control device which, in response to a change of transmission channels in the central station and in the subscriber stations in question, adjusts one or a plurality of transmission parameters so that both the band width of the available radio frequency channel is optimally utilized, and a required resistance to interference is attained in the radio frequency channel. To that end, the modems existing in the central station and in the subscriber stations are equipped with L transmission channels and K receiving channels, of which, in each case, a maximum of L-1 in the transmission direction, and a maximum of K-1 in the receiving direction are activated. In response to a change in the transmission channels with respect to the number of carriers and/or the transmission parameters of the individual carriers, the adjustment to the new transmission parameters is effected in the at least one non-activated transmission channel or receiving channel and, after acquisition of the new transmission parameters has been concluded, a switchover is made to this/these transmission channels or receiving channels.

25 Claims, 7 Drawing Sheets

FOREIGN PATENT DOCUMENTS

| | | |
|---|---|---|
| 0 250 926 | 1/1988 | (EP) . |
| 0 719 062 | 6/1996 | (EP) . |
| WO 85/03180 | 7/1985 | (WO) . |
| WO 95/34149 | 12/1995 | (WO) . |

* cited by examiner

POINT-MULTIPOINT RADIO TRANSMISSION SYSTEM

FIELD OF THE INVENTION

The present invention relates to a point-to-multipoint radio transmission system, made up of a central station and a plurality of subscriber stations, the transmission channels between the central station and the subscriber stations being assignable as needed.

BACKGROUND INFORMATION

Radio transmission systems, whether terrestrial radio relay systems or satellite transmission systems, make it possible to install new radio links, or to add to existing ones, very quickly. In such radio transmission systems, on one hand, the frequency spectrum available should be utilized as optimally as possible, and on the other hand, the radio transmission should be as resistant as possible to interfering influences (fading caused by weather, frequency-selective fading, interference by reflections, interference by neighboring radio cells, interference by other radio communication services, amplitude and phase distortions).

The demand for optimal frequency-spectrum utilization can be realized with point-to-multipoint radio transmission systems (radio relay, satellite radio). A point-to-multipoint radio relay system is explained in *Mikrowellen-Magazin* (Microwave Magazine), Vol. 10, No. 6, 1984, pp. 629, 630. According to that, utilization of the frequency band of the radio frequency channel available can be improved by usage of the necessary frequency band only as needed. The communication between the central station and the individual subscriber stations can be effected either through multiple access in frequency-division multiplexing (FDMA), in time-division multiplexing (TDMA), in code-division multiplexing(CDMA), in space-division multiplexing (SDMA), or in mixed forms of these access methods, it being possible to assign the frequency channels, the time slots, the spread codes and the spatial antenna lobes depending on the need of the subscribers.

In a point-to-multipoint radio relay system according to the German Patent Application No. 44 26 183, the transmission capacity is adapted flexibly to the need of the subscribers by adjusting the band width of the individual transmission channels to the data-transmission rate required in each case by the individual subscribers. Provision is also made for variable adjustment of the modulation type and the modulation depth (e.g. N-PSK, where N=2 . . . 16, or M-QAM, where M=4 . . . 256) to the individual transmission channels.

Channel coding represents a first aid for improving the resistance to interference. A further increase in interference resistance can be achieved by spectrum spreading and/or frequency hopping, as well as by orthogonal multi-carrier transmission according to a fixed, predefined scheme.

European Patent Application No. 0 719 062 describes a point-to-multipoint radio transmission system in which provision is made for a variable band-width allocation (band width on demand) between a central station and the individual subscribers. In this conventional transmission system, the signal transmission is based on a combination of code-division multiplexing (CDMA) and time-division multiplexing (TDMA). This European Patent Application discloses nothing about the operation of transmission and receiving devices of the subscribers and of the central station in response to a change in the band-width allocation.

Another conventional point-to-multipoint signal-transmission system is described in PCT International Patent Publication No. WO 95/34149, which includes no measures which permit a flexible adaption of transmission capacities to connected subscribers without interruption and interference.

At this point, the object of the present invention is to specify a point-to-multipoint radio transmission system of the type named at the outset, which both allows a flexible allocation and adaptation of transmission capacities to the connected subscriber stations, free of interruption and interference, on one hand, and, on the other hand, makes the radio transmission as resistant as possible to interfering influences (fading caused by weather, frequency-selective fading, interference by reflections, interference by neighboring radio cells, interference by other radio communication services, amplitude and phase distortions).

SUMMARY OF THE INVENTION

The stipulated objective is fulfilled in that provision is made for a control device, which, only in case of need for a higher resistance to interference in a transmission channel in the associated multiple-carrier modems with which both the central station and each subscriber station are equipped, given a transmission of the digital data in a single carrier, initially so adjusts one or a plurality of transmission parameters that the radio frequency channel is made as resistant as possible to interference, accompanied by the best possible utilization of the band width. In this context, each multi-carrier modem has at least two transmission channels and at least two receiving channels, the signal transmission in the modem being effected initially via only one transmission channel and one receiving channel, respectively. In the event of a change in the transmission channels, the control unit adjusts the new transmission parameters in the at least one transmission channel and receiving channel, respectively, not in operation, while the signal transmission is continued in the other transmission or receiving channels, and after acquisition of the radio frequency channel with the new transmission parameters has been concluded, a switchover is made to the transmission channel or receiving channel not previously in operation. On the other hand, only in case of need, if the interference resistance is not sufficient when transmitting with a single carrier, the objective according to the present invention is achieved by the fact that an existing control device triggers the transition from a single-carrier transmission to a multi-carrier transmission in such a way that, in the existing multi-carrier modems of the central station and of the subscriber stations, the data stream to be transmitted, if it does not already consist of a plurality of individual data streams (e.g. N×2 Mbit/s or M×1.5 Mbit/s), is demultiplexed into individual data streams, and these are transmitted in individual carriers, the transmission parameters of the individual carriers being optimized by the control device in response to the necessary resistance to interference. The quantity of carriers for a multi-carrier transmission is limited by the number implemented in the modems of the central station and of the subscriber station, and can be adapted accordingly, if necessary.

The transition from a one-carrier transmission to a multi-carrier transmission can be effected according to the present invention, without interruption or disturbance of the transmission, in that the multi-carrier modems of the central station and of the subscriber stations have more than two transmission channels and receiving channels, where, to change the transmission channels, triggered by the control device, both in the case of one-carrier transmission and in the case of multi-carrier transmission, at least one transmission channel or receiving channel is always available for the adjustment of new transmission parameters for one of the remaining transmission and receiving channels, while the signal transmission in the remaining transmission or receiving channels is continued. In this case, only after acquisition of the radio frequency channel having the new transmission parameters has been concluded is a switchover made to the at least one transmission or receiving channel previously not in operation.

Using the measures indicated above, given a point-to-multipoint radio transmission system, the available radio frequency channel can be adapted very flexibly to the necessary transmission channels of the individual subscribers, without the radio links having to be interrupted or being disturbed. All the transmission parameters of all transmission and receiving channels can be controlled by one control device in the case of a single-carrier transmission, in the case of a multi-carrier transmission, in the case of a transition from a single-carrier to a multi-carrier transmission, in the case of a transition from a multi-carrier to a single-carrier transmission, and in the case of a change in the number of carriers, given a multi-carrier transmission, with the goal both of an efficient utilization of the radio frequency channel, and of achieving a required resistance to interference.

Expedient further developments of the invention are derived from the dependent claims.

DETAILED DESCRIPTION

Figure 1:
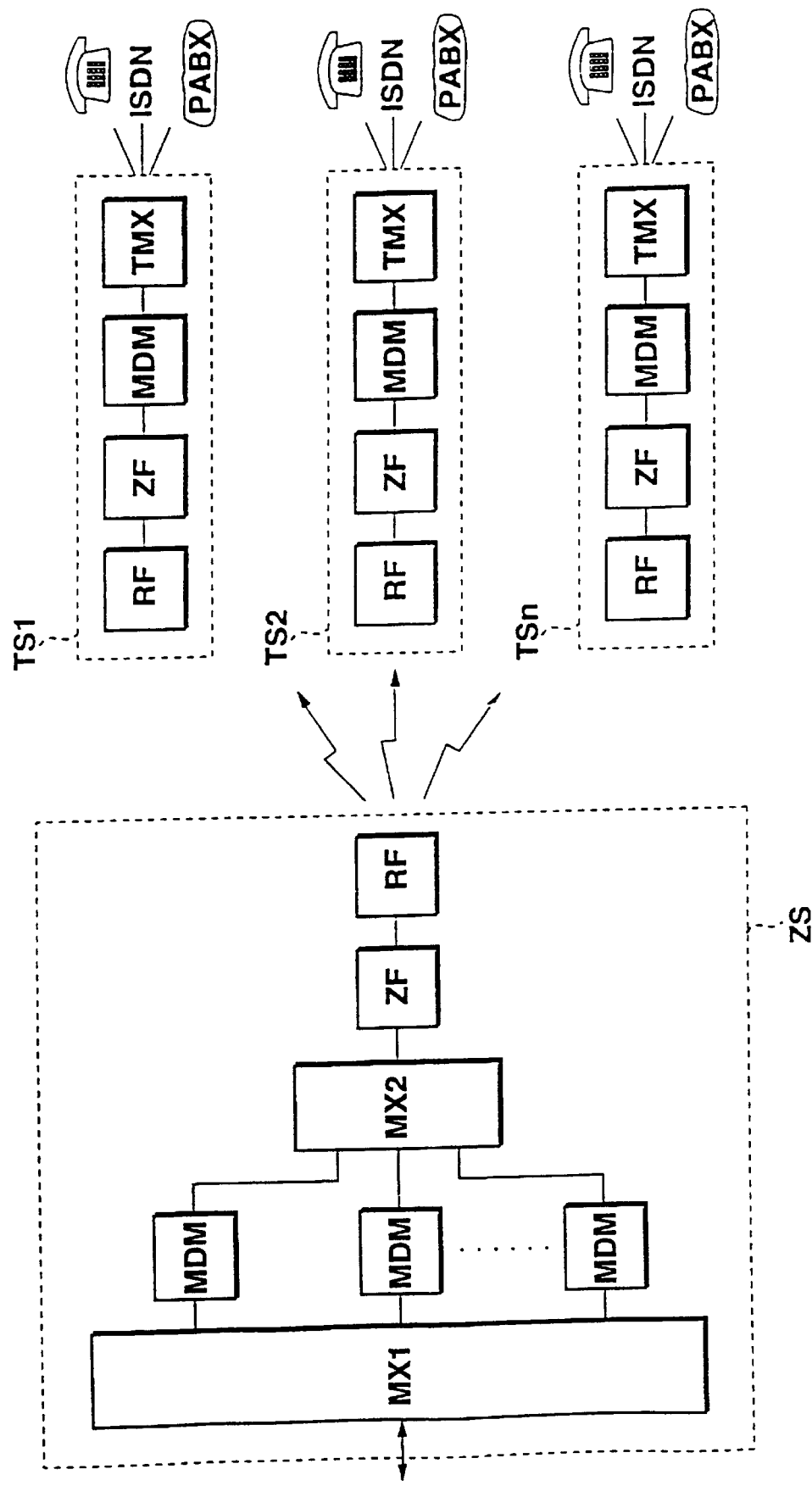
FIG. 1 shows a block diagram of a point-to-multipoint radio transmission system.

The point-to-multipoint radio transmission system, shown in principle in FIG. 1, is made up of one central station ZS and a plurality of subscriber stations TS1, TS2 . . . TSn. Central station ZS has as many parallel-connected modems MDM as the maximum number of subscriber stations TS1, TS2 . . . TSn able to establish a radio link to central station ZS. All modems MDM of central station ZS are interconnected at both outputs via multiplexers/demultiplexers MX1 and MX2. First multiplexer/demultiplexer MX1 produces the connection to other communications networks. Connected to second multiplexer/demultiplexer MX2 is a circuit block ZF which converts the received signals or the signals to be emitted into an intermediate-frequency level. Contiguous to that is a transmitter/receiving unit (Frontend) RF. The individual subscriber stations TS1, TS2 . . . TSn have a similar design. Contiguous to a transmitter/receiving unit RF is an intermediate-frequency circuit ZF, which, in turn, is connected to a modem MDM. A terminal-multiplexer/demultiplexer TMX produces the link between modem MDM and terminal-station devices (e.g. telephone) or public or private communication networks (e.g. ISDN, PABX).

Figure 2:
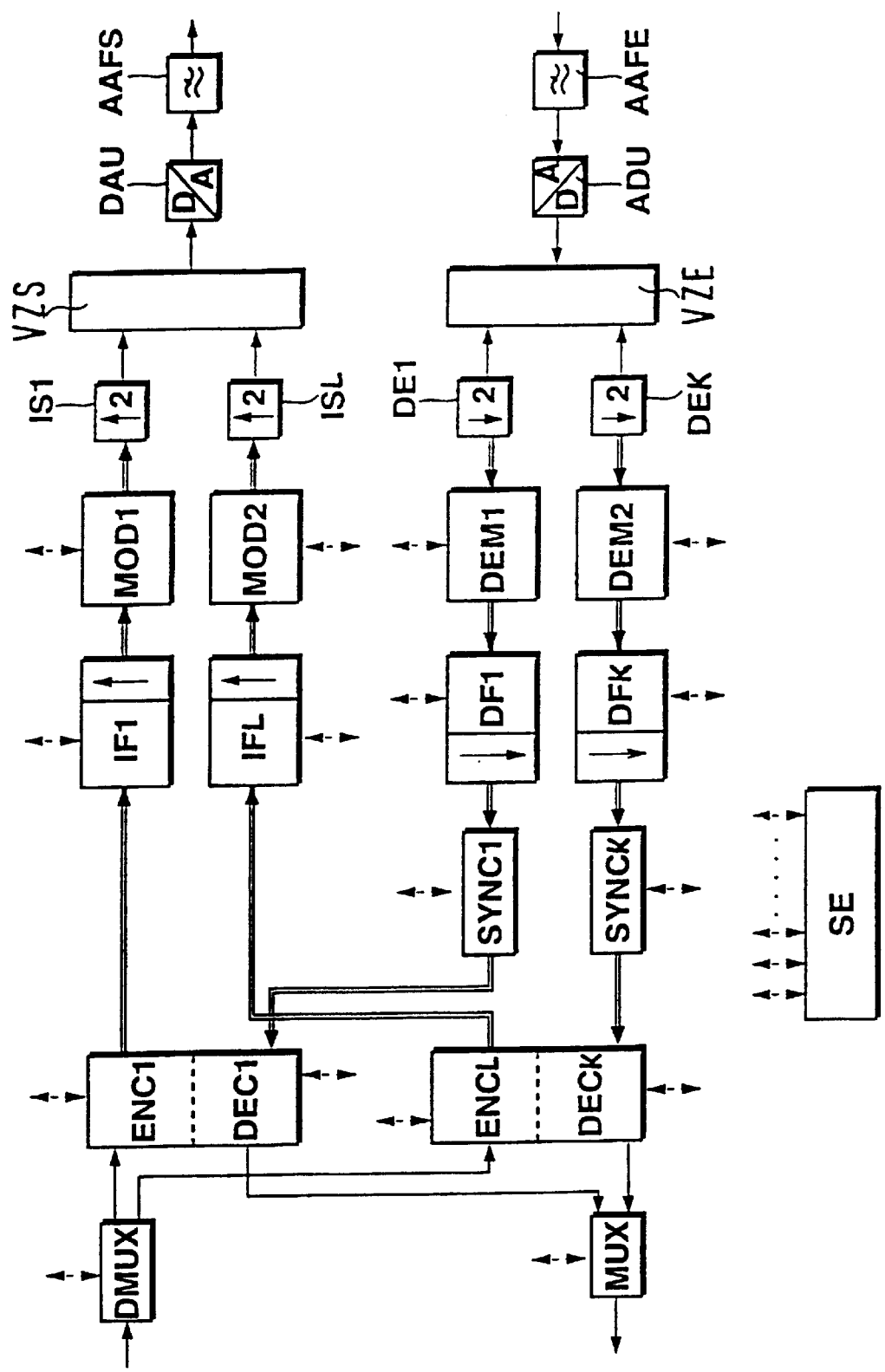
FIG. 2 shows a block diagram of a first embodiment of a modem according to the present invention.

FIG. 2 shows an example for the design of a modem MDM, as is employed in the same manner in central station ZS and in individual subscriber stations TS1, TS2. . . TSn. The modem has L transmission channels and K receiving channels, $L \geq 2$ and $K \geq 2$ being assumed.

A data signal to be emitted is put through by a demultiplexer DMUX in the transmission direction to one of L encoders ENC1 through ENCL. Each of L encoders ENC1 through ENCL belongs to one of L transmission channels. The connecting lines marked with a double line indicate that here, the digital data signals are complex, thus have a real and an imaginary part. Following each of L encoders ENC1 through ENCL is a variable interpolation filter IF1 through IFL (channel filter). Contiguous to them in each signal path is a modulator MOD1 through MODL, of which each is matched to the frequency of its associated transmission channel. Connected to the outputs of modulators MOD1 through MODL are interpolators IS1 through ISL having fixed interpolation factor 2 (e.g. according to German Patent No. 36 21 737), which convert the complex, digital, output signals of modulators MOD1 through MODL into real digital data signals. The real digital data signal of each transmission channel arrives, via a branching VZS, at a jointly shared digital/analogue converter DAU, which converts the digital data signal into an analogue data signal. The analogue data signal is subsequently carried via an anti-aliasing filter AAFS.

In the reverse direction—in the receiving direction—a received analogue data signal arrives, via an anti-aliasing filter AAFE, at an analogue/digital converter ADU. The real digital data signal emerging therefrom is fed, via a branching VZE, to all receiving-signal paths, of which each is allocated to one of the K receiving channels. Each receiving-signal path 1 through K has a decimator DE1 through DEK having a fixed decimation factor 2 (e.g. as described in German Patent No. 36 21 737), which converts the real digital output signal from the analogue/digital converter into a complex digital data signal. Following decimators DE1 through DEK of each receiving-signal path 1 through K is a demodulator DEM1 through DEMK for the complex digital data signal. The demodulators are matched to the frequency of their associated receiving channel. A decimation filter DF1 through DFK (matched filter) is connected downstream to demodulator DEM1 through DEMK in each signal path.

Decimation filters DF1 through DFK, as well as interpolation filters IF1 through IFL fulfill the matched-filter (e.g., root-Nyquist) condition. The construction and functioning method of such variable decimation filters and interpolation filters are described in the "Proceedings Second European Conference on Satellite Communications" Liege/Belgium, October 1991, ESA P-332, pp. 457–464.

Located in K receiving-signal paths are synchronizing circuits SNYC1 through SYNCK, as are likewise known from the cited "Proceedings Second European Conference on Satellite Communications" publications. They synchronize the circuits in the respective signal path to the carrier frequency, the carrier phase and the sampling rate of the received data signal. Thus, the modem is independent of synchronization signals, which otherwise would have to be transmitted together with the receiving signals.

A decoder DEC1 through DECK is located at the end of each receiving-signal path 1 through K. Both the coding in transmission-signal paths 1 through L and the decoding in receiving-signal paths 1 through K is done preferably with Viterbi coders/decoders. The outputs of decoders DEC1 through DECK lead to a multiplexer MUX.

Figure 3:
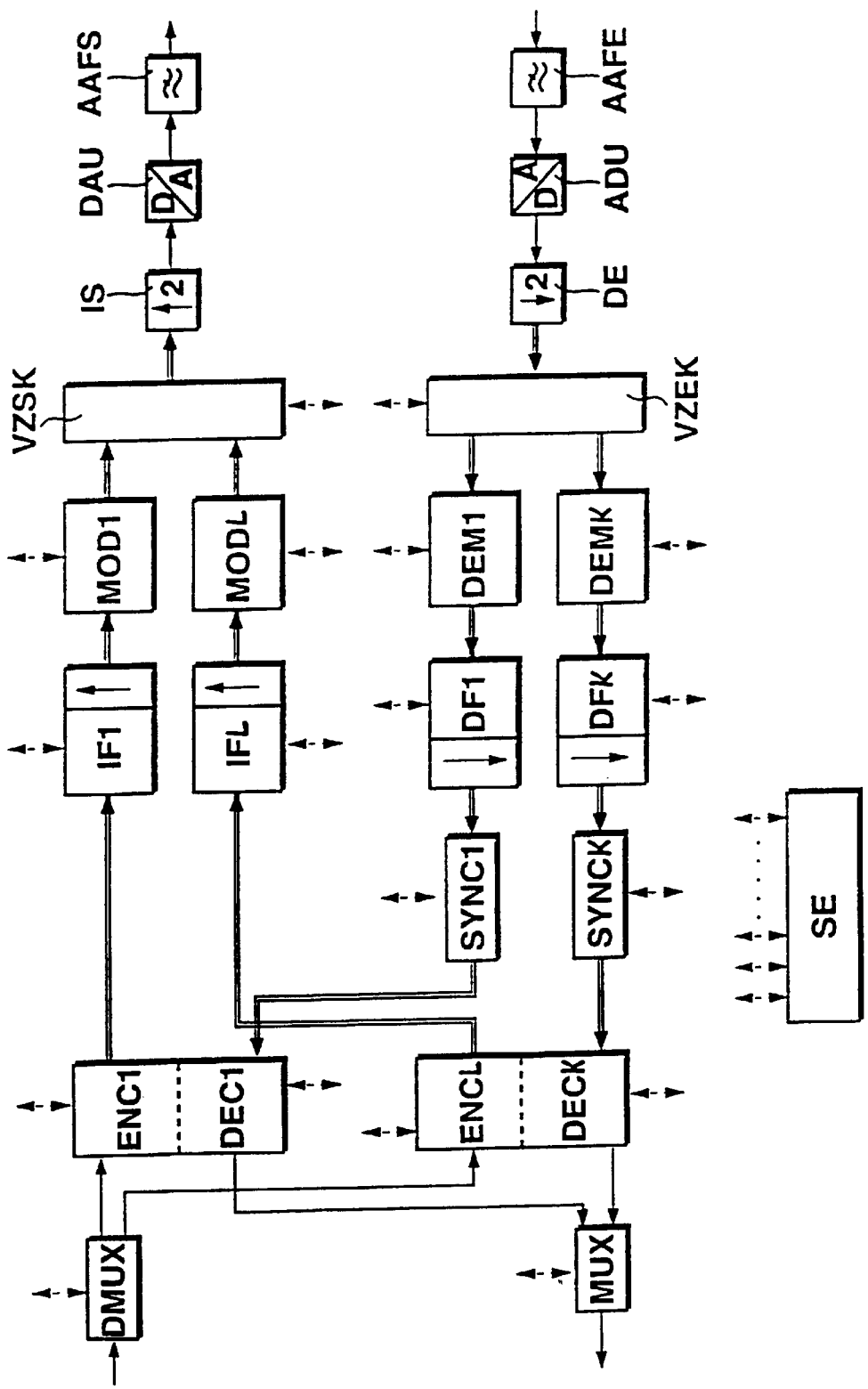
FIG. 3 shows a block diagram of a second embodiment of the modem according to the present invention.

Instead of providing a separate interpolator IS1 through ISL for each transmission-signal path 1 through L, or a separate decimator DE1 through DEK for each receiving-signal path 1 through K as shown in FIG. 2, it is also possible to use one interpolator IS or one decimator DE for the L transmission-signal paths and for the K receiving-signal paths, respectively, according to the exemplary embodiment shown in FIG. 3. Branching VZSK upstream of interpolator IS and branching VZEK downstream of decimator DE must then break up or combine complex digital signals.

Both branchings VZS, VZE for real digital signals see (FIG. 2) and branchings VZSK, VZEK for complex digital signals see (FIG. 3) can be designed as frequency-division multiplexers (VZS, VZSK in the transmission direction) or as frequency demultiplexers (VZE1, VZEK in the receiving direction).

Interpolators IS, IS1 through ISL and decimators DE, DE1 through DEK can be realized as complex half-band filters (compare with European Patent Application No. 0 250 926).

The complex carrier waves for complex digital modulators MOD1 through MODL and demodulators DEM1 through DEMK are expediently produced using the method of direct digital synthesis (DDS) (compare "An Analysis of the Output Spectrum of Direct Digital Frequency Synthesizers in the Presence of Phase-Accumulator Truncation", IEEE 1987, 41st Annual Frequency Control Symposium, page 495 ff.).

As stated above, the point-to-multipoint radio transmission system is intended to render possible a very flexible allocation of transmission channels between the central station and subscriber stations, the radio frequency channel available being optimally utilized. If the number of needed transmission channels changes because one or a plurality of subscriber stations newly initiate a data exchange with the central station, or break off the data transmission, then the transmission parameters in the modems in the central station and in subscriber stations that are affected by the change in transmission channels are altered from a control device SE present in central station ZS, so that the transmission channels efficiently occupy the radio frequency channel. Belonging first of all to the variable transmission parameters for each individual carrier are, for example, the data rate, the modulation type or modulation depth (e.g. N-PSK, where N=2 . . .16, or M-QAM, where M=4 . . . 256), the coding, the channel frequency, or even the transmission level and parameters for assessing signal quality, in order to ensure a predefined data-transmission quality (e.g. bit-error rate <10$^{-7}$), and to minimize hop influences (fadings, reflections). Also belonging to the variable transmission parameters are the number of carriers used for the transmission, which includes single-carrier and multi-carrier transmission, such that, in the case of multi-carrier transmission, each individual carrier can be controlled individually in all transmission parameters specified above. Hereinafter, these features are combined under the term Dynamic Orthogonal Frequency Division Multiplex (DOFDM).

Thus, in response to a change in the number of necessary transmission channels, or to a change in the necessary interference resistance, control device SE calculates the transmission parameters according to the indicated standpoints of efficient utilization of the entire band width of the radio frequency channel, and of a necessary interference resistance for the transmission. Control device SE emits these altered transmission parameters as control signals (indicated as broken double-arrow lines in the Figures) to the circuit blocks in question in the modems. For example, the control signals for the modems in the subscriber stations are transmitted via a signaling channel which is either appended to one or a plurality of useful-signal channels, or is broadcast as a separate broadcast channel. From the transmission parameters, the number I (with the secondary condition: $1 \leq 1 \leq L-1$) first of all fixes the current number of transmission carriers to be activated, and the number k (with the secondary condition: $1 \leq k \leq K-1$) fixes the current number of receiving carriers to be activated.

The data rate of all transmission carriers 1 through L is adjusted in variable interpolation filters IF1 through IFL, and the data rate of all receiving carriers 1 through K is adjusted in decimation filters DF1 through DFK. Changes in the carrier frequency of transmission carriers 1 through L are made in modulators MOD1 through MODL, and those of receiving carriers 1 through K are made in demodulators DEM1 through DEMK. A change in the modulation and coding is carried out for transmission carriers 1 through L in encoders ENC1 through ENCL, and for receiving carriers 1 through K in decoders DEC1 through DECK.

As described above, in each modem there are L transmission channels and K receiving channels. The quantity 1 of the activated transmission channels may reach maximally the number L-1, so that at least one non-active transmission channel is still available for the change in transmission parameters. In the same way, the quantity k of the activated receiving channels may reach maximally the number K-1, so that at least one non-active receiving channel is still available for the change in transmission parameters.

When control device SE either receives a demand for a change in the transmission channels, or has determined the necessity for an increase in interference resistance, and thereupon newly calculates the transmission parameters accordingly, it emits its new transmission parameters as control signals to the circuit blocks in question of a non-active transmission and/or receiving channel. As soon as the new transmission parameters have been set in the respective transmission and/or receiving channels of the modems of the central station, as well as of the associated subscriber stations, a confirmation of the successful acquisition of all newly activated transmission and/or receiving channels via the signaling path is awaited at control device SE, before the signal transmission is shifted to the newly activated transmission and/or receiving channels, and the transmission and/or receiving channels replaced by them are deactivated. In this manner, disturbing interruptions during the signal transmission are avoided.

Control unit SE makes the selection of the transmission and/or receiving channels in the respective modems of the central and subscriber stations, based on the status information as to which of the channels are active and which are inactive.

In the exemplary embodiments described above, a separate signal path is allocated to each transmission channel and receiving channel, respectively. That is to say, a large portion of circuit blocks L-fold or K-fold are present for the transmission direction and for the receiving direction. This outlay for circuitry can be reduced, in that portions both for the L transmission-signal paths and for the K receiving-signal paths are operated in time-division multiplexing.

Figure 4:
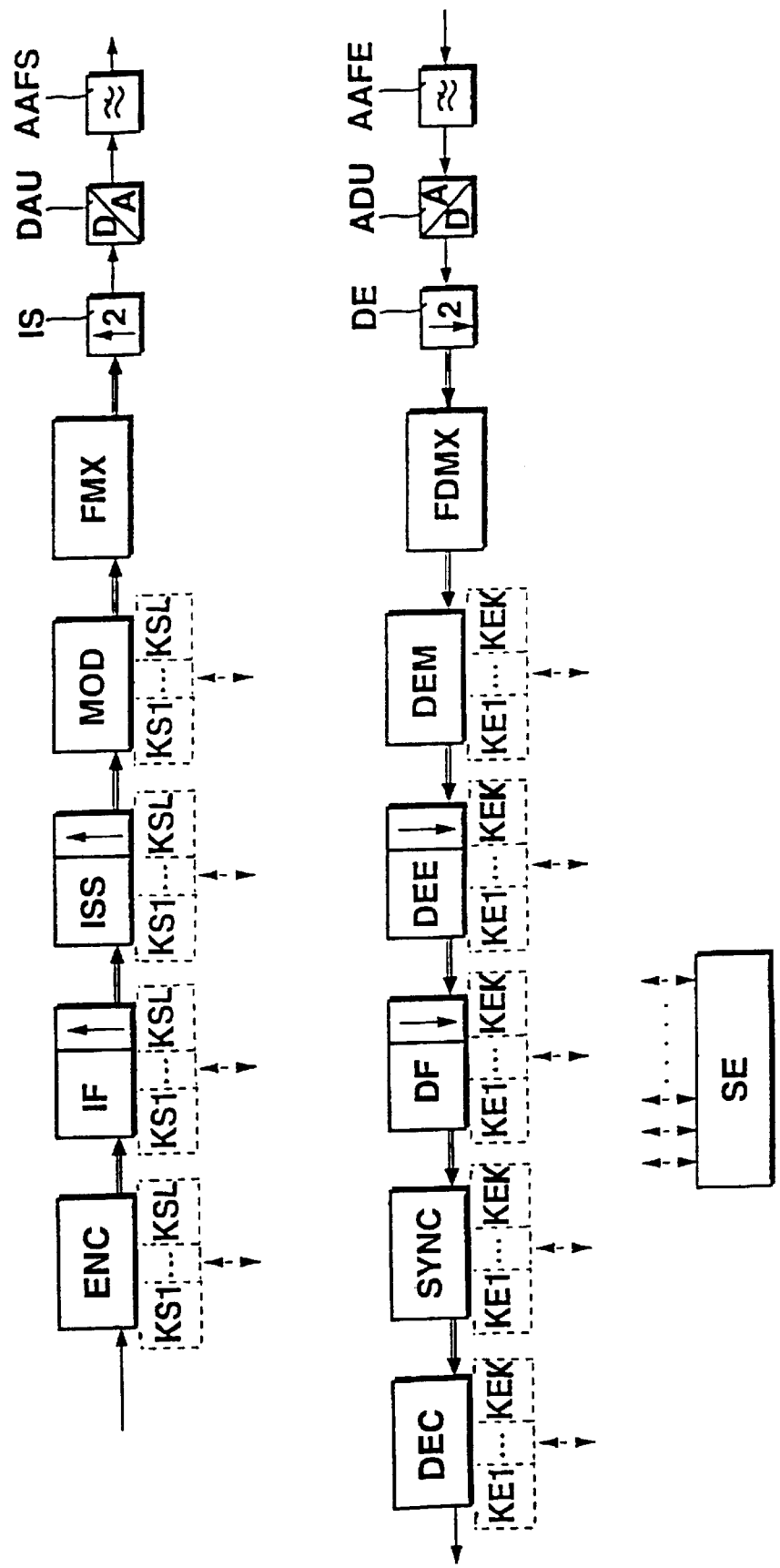
FIG. 4 shows a block diagram of a third embodiment of the modem according to the present invention having multiplexed transmitting and receiving channels.

FIG. 4 shows one signal path for the L transmission channels, and one signal path for the K receiving channels.

For the L transmission channels, the transmission-signal path has one encoder ENC, one variable interpolation filter IF and one modulator MOD. In addition, a further interpolator ISS having a fixed interpolation factor can also be inserted between variable interpolation filter IF and modulator MOD, as can be gathered from FIG. 4. Because of this additional interpolator ISS, variable interpolation filter IF needs to have only a low interpolation factor. The functioning of the individual circuit blocks ENC, IF, ISS, MOD and of the circuit blocks (interpolator IS, digital/analogue converter DAU, anti-aliasing filter AAFS) contiguous to frequency-division multiplexer FMX is not discussed in detail here, because they have already been described more precisely in connection with the exemplary embodiments shown in FIGS. 2 and 3. The same holds true for the individual circuit blocks of the receiving-signal path shown in FIG. 4. In the same way, this one receiving-signal path, in which all circuit blocks are found only singly, is provided for the transmission of the K receiving channels. Decimator DEE, inserted optionally between demodulator DEM and variable decimation filter DF and having a fixed decimation factor, makes it possible to provide a low decimation factor for variable decimation filter DF.

The dash-lined blocks added to the individual circuit elements are intended to clarify that L transmission channels KS1 through KSL can be processed in time-division multiplexing by way of the one transmission-signal-processing, and K receiving channels KE1 through KEK in time-division multiplexing by way of the one receiving-signal path-processing.

Downstream of modulator MOD, the L transmission channels are combined by a frequency-division multiplexer FMX to form one transmission signal, and the separation of a receiving signal into the K receiving channels is carried out by a frequency demultiplexer FDMX arranged upstream of demodulator DEM.

Figure 5:
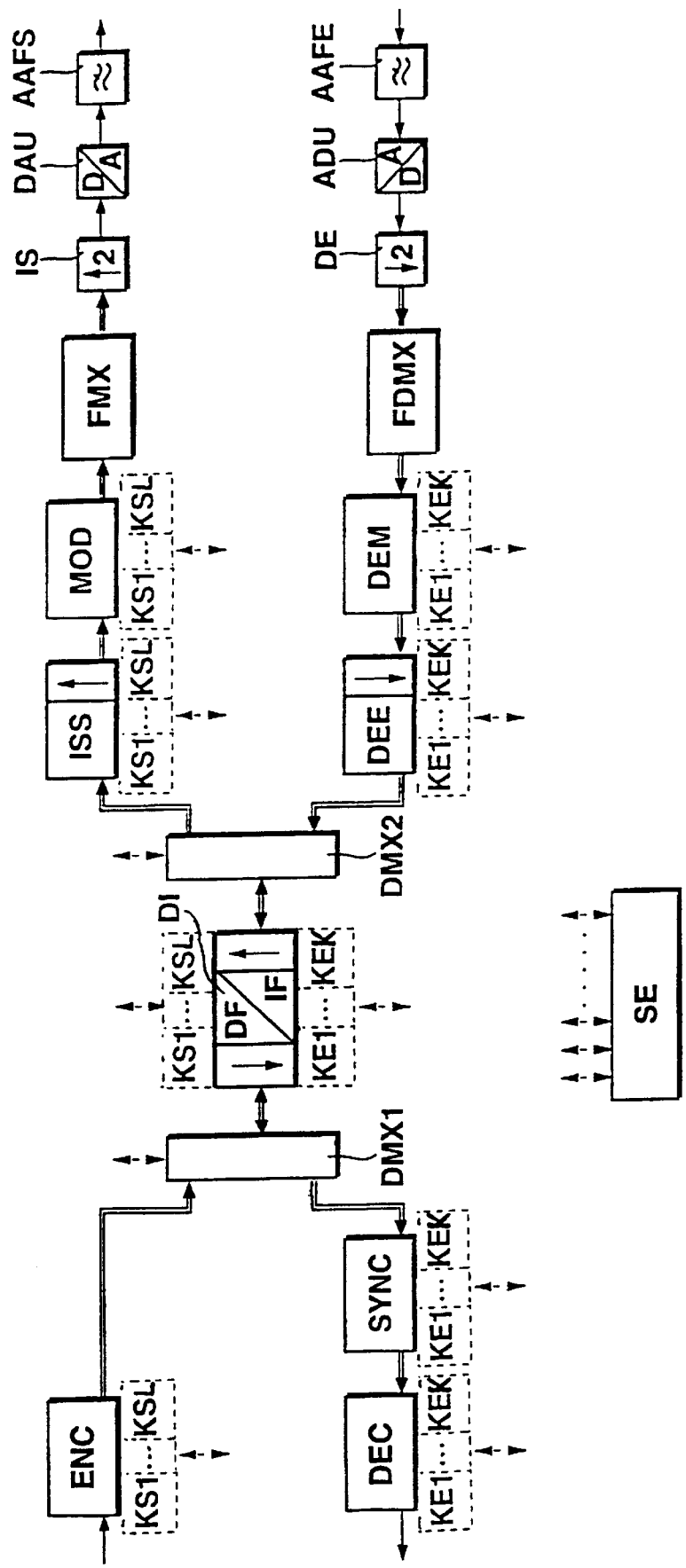
FIG. 5 shows a block diagram of a fourth embodiment of the modem according to the present invention having multiplexed transmitting and receiving channels.

The circuit elements can be further concentrated in that, as shown in FIG. 5, with regard to the variable decimation and the variable interpolation, L transmission channels and K receiving channels are multiplexed by way of a single unit. To that end, provision is made for a functional unit DI which includes both a variable decimation filter DF and a variable interpolation filter IF.

The effect of multiplexers/demultiplexers DMX1 and DMX2 at both ports of functional unit D1 is that both the L transmission channels and the K receiving channels can be processed in time-division multiplexing by way of functional unit D1. All other circuit units which have the same reference symbols as in FIG. 4, also have the same function as in the exemplary embodiment of a modem depicted in FIG. 5.

Figure 6:
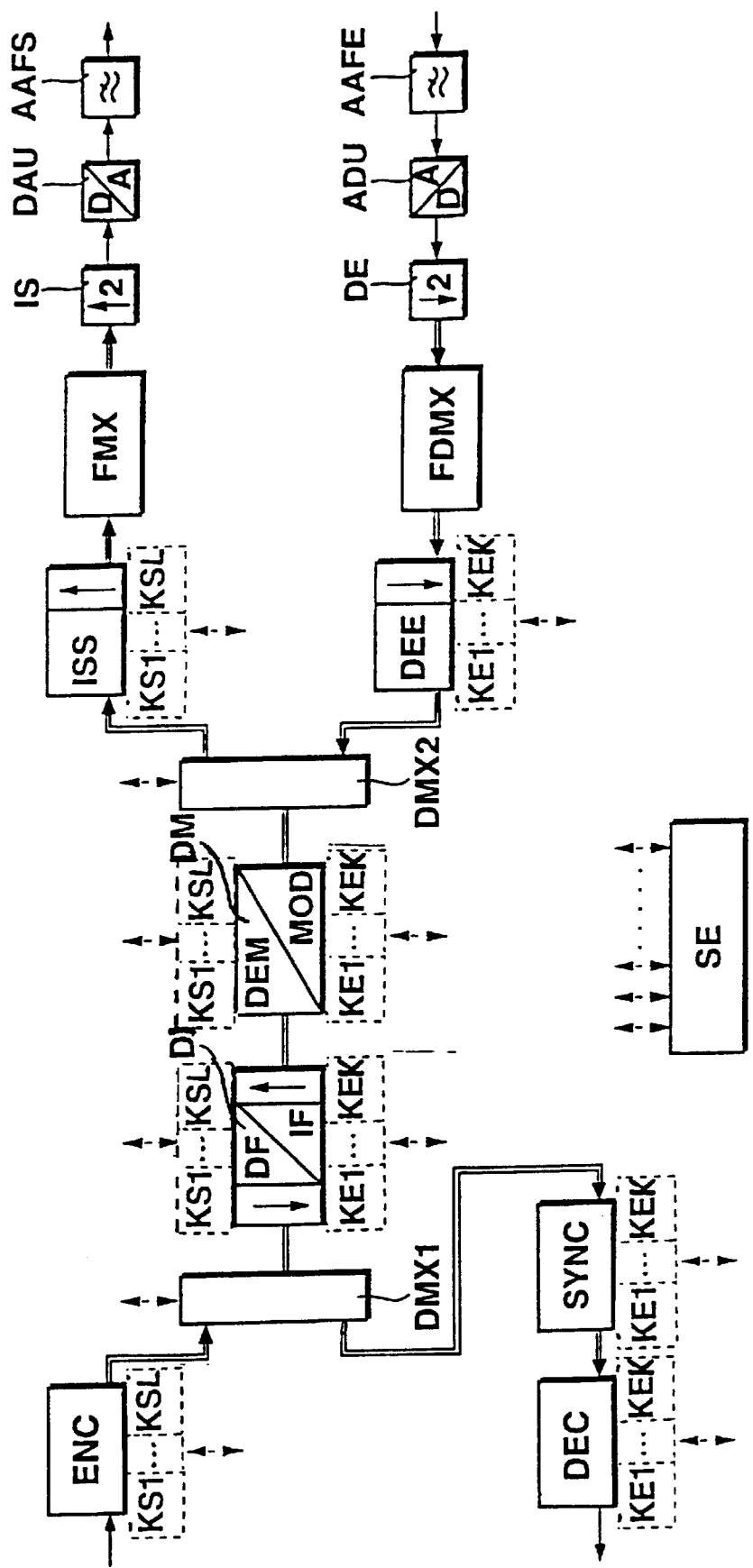
FIG. 6 shows a block diagram of a fifth embodiment of the modem according to the present invention having multiplexed transmitting and receiving channels.

In the modem shown in FIG. 6, demodulator DEM and modulator MOD are also combined in a shared functional unit DM which processes both the L transmission channels and the K receiving channels in time-division multiplexing. This circuitry variant of the modem again brings a reduction in circuitry expenditure. However, interpolator ISS and decimator DEE must have complex coefficients.

Figure 7:
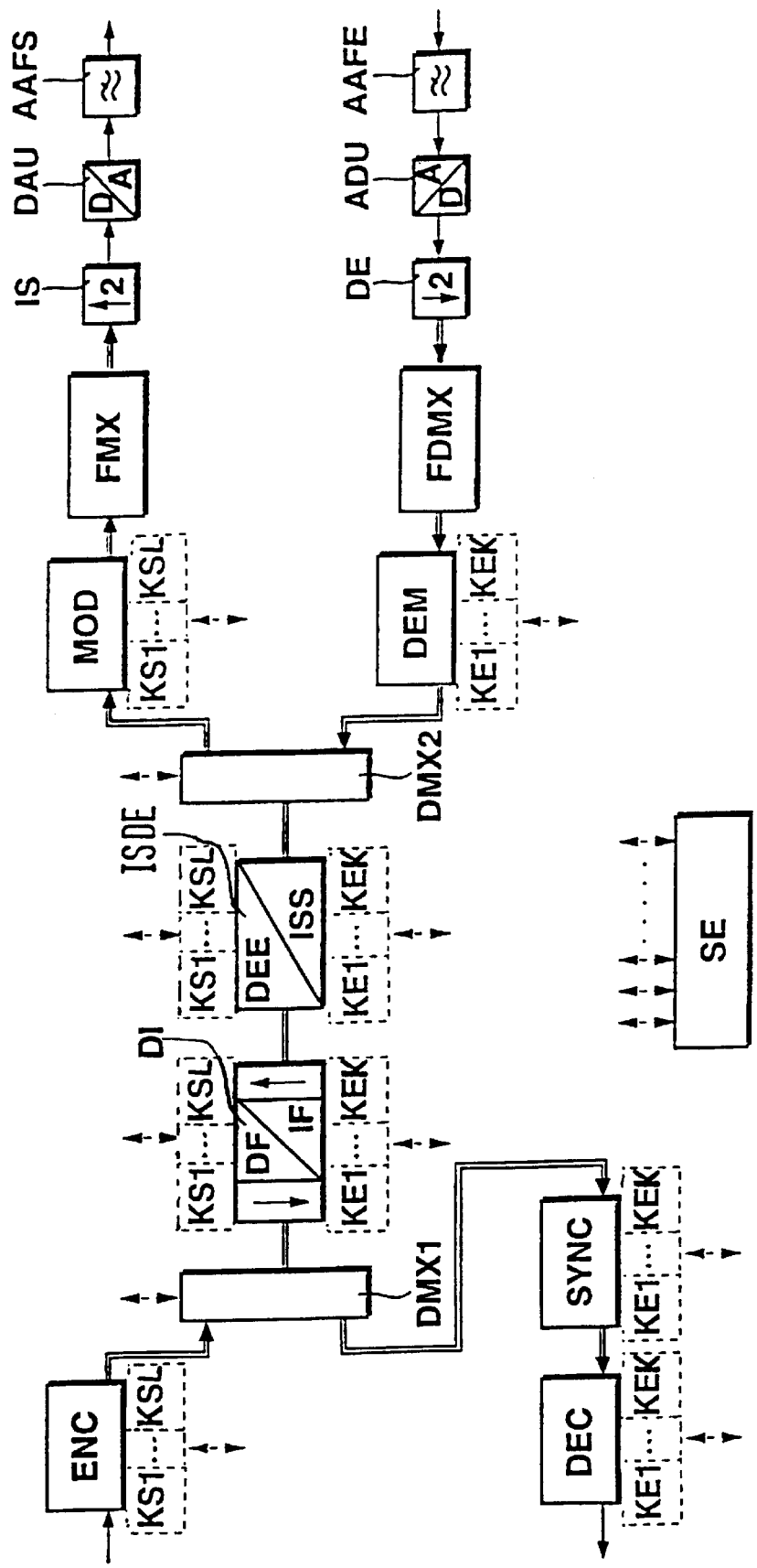
FIG. 7 shows a block diagram of a sixth embodiment of the modem according to the present invention having multiplexed transmitting and receiving channels.

Compared to the embodiment depicted in FIG. 6, FIG. 7 shows an even more favorable circuit arrangement from the standpoint of expenditure. By interchanging the order of modulator MOD and interpolator ISS, and interchanging demodulator DEM and decimator DEE, interpolator ISS and decimator DEE can be realized with real coefficients; both are combined in a shared functional unit ISDE. The advantages of processing the transmission-signal and receiving-signal paths in time-division multiplexing are retained.

Instead of shifting to not yet active transmission and receiving channels, a continuous change of the transmission parameters can also be made in each individual transmission or receiving channel of the modems. Equally, the transmission can be interrupted short-term, so that the transmission parameters can be altered during this period of interruption time. The data which is received or is to be transmitted is stored temporarily during this period of interruption time, so that it is not lost.

What is claimed is:

1. A point-to-multipoint radio transmission system, comprising:

a central station utilizing a first set of transmission channels and including at least one central station modem for each channel of the first set of the transmission channels;

subscriber stations utilizing a second set of transmission channels, each of the subscriber stations including at least one subscriber modem, each respective modem of the station and subscriber modems including a first number of transmitting channels and a second number of receiving channels, each of the first and second numbers being greater than one, the respective modem transmitting at least one signal via a maximum of a third number of the transmitting channels or via a maximum of a fourth number of the receiving channels, the third number being less than the first number by one, the fourth number being less than the second number by one; and a control device adjusting, for each of the station and subscriber modems and when a change occurs in at least one of the transmission channels and a predetermined interference resistance of the transmission channels, at least one of:

a fifth number of first active channels of the transmitting channels, a sixth number of second active channels of the receiving channels, and at least one of a plurality of transmission parameters of at least one of the first active channels and the second active channels, the fifth number being between one and the third number, the sixth number being between one and the fourth number, the control device performing an adjustment at least one of to optimally utilize a bandwidth of an available radio frequency channel and to achieve the predetermined interference resistance in the transmission channels, the plurality of transmission parameters including at least one of a channel carrier frequency, a data rate, a modulation, a coding, a transmission level and signal quality evaluation parameters, wherein, when the plurality of transmission parameters are changed, the control device adjusts further transmission parameters in a non-operating channel of the transmitting or receiving channels, while the at least one signal is transmitted via at least one other channel of the transmitting channels or of the receiving channels, and the control device prevents a switchover to the non-operating channel until further transmission channels are acquired.

2. The point-to-multipoint radio transmission system according to claim 1, wherein at least one modem of the station modem and subscriber modem includes:

encoders and modulators, a single encoder of the encoders and a single modulator of the modulators being assigned to each of the transmitting channels, and variable interpolation filters, a single interpolation filter of the variable interpolation filters being assigned to each channel of the transmitting channels, wherein, for each of the transmitting channels, a particular filter of the interpolation filters is coupled between a respective encoder of the encoders and a respective modulator of the modulators.

3. The point-to-multipoint radio transmission system according to claim 2, wherein the at least one modem includes interpolators, a single interpolator of the interpolators being assigned to each of the transmitting channels, wherein, for each of the transmitting channels, a particular interpolator of the interpolators is positioned downstream of a respective modulator of the modulators, the particular interpolator converting a complex digital output signal generated by the respective modulator to a real digital signal.

4. The point-to-multipoint radio transmission system according to claim 3, wherein at least one of the interpolators is a complex half-band filter.

5. The point-to-multipoint radio transmission system according to claim 2, wherein the at least one modem includes interpolators, a single interpolator of the interpolators being assigned to each of the transmitting channels, wherein, for each of the transmitting channels, the modulators provide output signals via a respective branching arrangement to a particular interpolator of the interpolators, and wherein, for each of the transmitting channels, the particular interpolator converts a complex digital output signal generated by a respective modulator of the modulators into a real digital signal.

6. The point-to-multipoint radio transmission system according to claim 5, wherein at least one of the interpolators is a complex half-band filter.

7. The point-to-multipoint radio transmission system according to claim 5, wherein the branching arrangement is a frequency-division multiplexer.

8. The point-to-multipoint radio transmission system according to claim 1, wherein at least one modem of the station modem and subscriber modem includes encoders, modulators and variable interpolation filters processing all of the transmitting channels in a time-division multiplexing manner, wherein, for each of the transmitting channels, a particular filter of the variable interpolation filters is positioned between a respective encoder of the encoders and a respective modulator of the modulators.

9. The point-to-multipoint radio transmission system according to claim 8, wherein the at least one modem includes multiplexers and interpolators, a single interpolator of the interpolators being assigned to each of the transmitting channels, and wherein, for each of the transmitting channels, a particular multiplexer provides a complex digital output signal generated by a respective modulator of the modulators to a respective interpolator of the interpolators, the respective interpolator converting the complex digital output signal into a real digital signal.

10. The point-to-multipoint radio transmission system according to claim 9, wherein at least one of the interpolators is a complex half-band filter.

11. The point-to-multipoint radio transmission system according to claim 8, wherein the at least one modem includes shared function units, and wherein, for each of the transmitting channels, a particular one of the multiplexers processes the first number of the transmitting channels in a time-division multiplexing manner using a respective unit of the shared functional units, the respective unit including the variable interpolation filter.

12. The point-to-multipoint radio transmission system according to claim 8, wherein the at least one modem includes first function units and second functional units, and wherein, for each of the transmitting channels, a particular one of the multiplexers processes the first number of the transmitting channels in a time-division multiplexing manner using a respective first unit of the first functional units and a respective second unit of the second functional units, the respective first unit including the variable interpolation filter, the respective second unit including the modulator.

13. The point-to-multipoint radio transmission system according to claim 8, wherein the at least one modem includes first function units and second functional units, and wherein, for each of the transmitting channels, a particular one of the multiplexers processes the first number of the transmitting channels in a time-division multiplexing manner using a respective first unit of the first functional units and a respective second unit of the second functional units, the respective first unit including the variable interpolation filter, the respective second unit including an interpolator having a fixed interpolation factor.

14. The point-to-multipoint radio transmission system according to claim 1, wherein at least one modem of the station modem and subscriber modem includes:

demodulators and decoders, a single demodulator of the demodulators and a single decoder of the decoders being assigned to each channel of the receiving channels, and variable decimation filters, a single decimation filter of the variable decimation filters being assigned to each channel of the receiving channels, wherein, for each of the receiving channels, a particular decimation filter of the decimation filters is coupled between a respective decoder of the decoders and a respective demodulator of the demodulators.

15. The point-to-multipoint radio transmission system according to claim 14, wherein the at least one modem includes:

decimators, a single decimator of the decimators being assigned to each channel of the receiving channels, and wherein, for each of the receiving channels, a particular decimator of the decimators is coupled upstream to a respective demodulator of the demodulators, the particular decimator converting a real digital receiving signal into a complex digital signal.

16. The point-to-multipoint radio transmission system according to claim 15, wherein at least one of the decimators is a complex half-band filter.

17. The point-to-multipoint radio transmission system according to claim 14, wherein the at least one modem includes:
  decimators, a single decimator of the decimators being assigned to each channel of the receiving channels, and
  wherein, for each of the receiving channels, a particular decimator of the decimators converts a real digital receiving signal into a complex digital signal, the complex digital signal being provided to the a respective demodulator of the demodulators via a branching arrangement.

18. The point-to-multipoint radio transmission system according to claim 17, wherein at least one of the decimators is a complex half-band filter.

19. The point-to-multipoint radio transmission system according to claim 17, wherein the branching arrangement is a frequency demultiplexer.

20. The point-to-multipoint radio transmission system according to claim 1,
  wherein at least one modem of the station modem and subscriber modem includes:
  demodulators, decoders and variable decimation filters positioned between the demodulators and the decoders,
  wherein, for each of the receiving channels, a single modulator of the demodulators, a single decoder of the decoders and a single decimation filter are assigned to each of the receiving channels, and
  wherein all of the receiving channels are processed in a time-division multiplexing manner using the demodulators, the variable decimation filters and the decoders.

21. The point-to-multipoint radio transmission system according to claim 20,
  wherein, for each of the receiving channels, a respective decimator of the decimators converts a real digital receiving signal into a complex digital receiving signal,
  wherein the at least one modem includes demultiplexers, a single demultiplexer of the demultiplexers being assigned to each of the receiving channels, and
  wherein, for each of the receiving channels, a particular demultiplexer provides the complex digital receiving signal to a respective demodulator of the demodulators.

22. The point-to-multipoint radio transmission system according to claim 21, wherein at least one of the decimators is a complex half-band filter.

23. The point-to-multipoint radio transmission system according claim 20,
  wherein the at least one modem includes shared function units, and
  wherein, for each of the receiving channels, a particular one of the demultiplexers processes the second number of the receiving channels in a time-division multiplexing manner using a respective unit of the shared functional units, the respective unit including the variable decimation filter.

24. The point-to-multipoint radio transmission system according to claim 20,
  wherein the at least one modem includes first function units and second functional units, and
  wherein, for each of the receiving channels, a particular one of the demultiplexers processes the second number of the receiving channels in a time-division multiplexing manner using a respective first unit of the first functional units and a respective second unit of the second functional units, the respective first unit including the variable decimation filter, the respective second unit including the demodulator.

25. The point-to-multipoint radio transmission system according to claim 20,
  wherein the at least one modem includes first function units and second functional units, and
  wherein, for each of the receiving channels, a particular one of the demultiplexers processes the second number of the receiving channels in a time-division multiplexing manner using a respective first unit of the first functional units and a respective second unit of the second functional units, the respective first unit including the variable decimation filter, the respective second unit including a decimator having a fixed decimation factor.

* * * * *